(12) United States Patent
Grothoff et al.

(10) Patent No.: US 11,804,117 B2
(45) Date of Patent: Oct. 31, 2023

(54) SUBSCRIBER, MODULE OF A SUBSCRIBER AND METHOD FOR CONFIGURING A SUBSCRIBER

(71) Applicant: Minimax GmbH, Bad Oldesloe (DE)

(72) Inventors: Axel Grothoff, Neumünster (DE); Thorsten Mitzlaff, Bad Oldesloe (DE)

(73) Assignee: Minimax GmbH, Bad Oldesloe (DE)

( * ) Notice: Subject to any disclaimer, the term of this patent is extended or adjusted under 35 U.S.C. 154(b) by 723 days.

(21) Appl. No.: 16/968,503

(22) PCT Filed: Jan. 25, 2019

(86) PCT No.: PCT/EP2019/051838
§ 371 (c)(1),
(2) Date: Aug. 7, 2020

(87) PCT Pub. No.: WO2019/154635
PCT Pub. Date: Aug. 15, 2019

(65) Prior Publication Data
US 2020/0410833 A1    Dec. 31, 2020

(30) Foreign Application Priority Data
Feb. 9, 2018   (DE) .................. 10 2018 102 930.6

(51) Int. Cl.
*G08B 17/06*    (2006.01)
*H04W 12/72*    (2021.01)
(Continued)

(52) U.S. Cl.
CPC .............. *G08B 17/06* (2013.01); *A62C 35/68* (2013.01); *A62C 37/40* (2013.01); *G08B 29/043* (2013.01); *H04M 11/04* (2013.01); *H04W 12/72* (2021.01)

(58) Field of Classification Search
CPC ...... G08B 17/06; G08B 29/043; A62C 35/68; A62C 37/40; H04M 11/04; H04W 12/72; (Continued)

(56) References Cited

U.S. PATENT DOCUMENTS 5,818,334 A    10/1998   Stanley
6,564,056 B1 *  5/2003   Fitzgerald ............... H04L 63/04
                                                      340/5.1
(Continued)

FOREIGN PATENT DOCUMENTS

DE    10 2016 201 883 A1    8/2017
GB         2 538 796 A     11/2016
WO     WO 2010/043272 A1    4/2010

OTHER PUBLICATIONS

International Searching Authority, International Search Report and Written Opinion (with English translation), Intl Application No. PCT/EP2019/051838, 19 pages (dated Apr. 8, 2019).

*Primary Examiner* — Ojiako K Nwugo
(74) *Attorney, Agent, or Firm* — Perkins Coie LLP (57) ABSTRACT

The present invention relates to a subscriber, in particular a module or device for monitoring a function and/or status and/or for transmitting an alarm, having: a first interface for communicating with a control panel, preferably a fire alarm and/or extinguishing control panel, a data memory for storing configuration data relating to the subscriber comprising at least an identifier of the subscriber for identifying the subscriber with respect to the control panel, a second interface for inputting configuration data to the data memory. The second interface has an NFC interface for communicating with a mobile write and/or read device The NFC interface is configured to receive at least the identifier of the subscriber from the mobile write and/or read device and to transmit it to the data memory. The invention improves known subscribers to the effect that a configura- (Continued)

tion which is less susceptible to faults and is simpler at the same time is possible.

17 Claims, 3 Drawing Sheets

(51) Int. Cl.
*A62C 35/68* (2006.01)
*A62C 37/40* (2006.01)
*H04M 11/04* (2006.01)
*G08B 29/04* (2006.01)

(58) Field of Classification Search
CPC ......... H04L 2012/2841; H04L 12/2825; H04L 12/2809
See application file for complete search history.

(56) References Cited

U.S. PATENT DOCUMENTS

| | | | |
|---|---|---|---|
| 9,521,009 B1* | 12/2016 | Skeffington | H04W 4/33 |
| 2010/0332615 A1* | 12/2010 | Short | H04L 61/25 |
| | | | 709/225 |
| 2011/0150188 A1* | 6/2011 | Buss | G08B 29/123 |
| | | | 379/27.01 |
| 2012/0096159 A1* | 4/2012 | Short | H04L 63/08 |
| | | | 709/225 |
| 2015/0327004 A1* | 11/2015 | Jin | H04W 4/80 |
| | | | 455/41.1 |
| 2016/0099832 A1* | 4/2016 | Alshinnawi | H04L 41/0886 |
| | | | 709/221 |
| 2016/0338170 A1 | 11/2016 | Lebel et al. | |
| 2016/0374120 A1 | 12/2016 | Logue et al. | |
| 2017/0047969 A1* | 2/2017 | Mroszczak | G07C 9/28 |
| 2017/0235290 A1* | 8/2017 | Weber | H04L 12/2825 |
| | | | 700/276 |
| 2017/0364713 A1* | 12/2017 | Speak | G06F 21/53 |
| 2018/0375965 A1* | 12/2018 | Fitzgibbon | G08C 17/02 |

* cited by examiner

SUBSCRIBER, MODULE OF A SUBSCRIBER AND METHOD FOR CONFIGURING A SUBSCRIBER

PRIORITY CLAIM AND INCORPORATION BY REFERENCE

This application is a 35 U.S.C. § 371 application of International Application No. PCT/EP2019/051838, filed Jan. 25, 2019, which claims the benefit of German Application No. 10 2018 102 930.6, filed Feb. 9, 2018, each of which is incorporated by reference in its entirety.

BACKGROUND OF THE INVENTION

The present invention relates to a subscriber, in particular a module or device for monitoring a function and/or status and/or for transmitting an alarm, to a communication module of a subscriber, to a system for configuring a fire protection system and to a method for configuring a subscriber. The invention is used, in particular, in the field of fire protection technology, but other applications are also conceivable.

The present invention relates, in particular, to a subscriber of the type having a first interface for communicating with a control panel, preferably a fire alarm and/or extinguishing control panel, wherein the first connection interface is designed, in particular, for connection by means of a connecting line in the form of a ring bus line, a data memory for storing data relating to the subscriber comprising at least an identifier of the subscriber for identifying the subscriber with respect to the control panel, and a second interface for inputting data to the data memory.

Subscribers of this type, in particular when used in fire protection systems, are usually already installed in a relatively large number during construction measures when erecting a building or renovating the latter. In this case, it is decisive that a fire alarm and/or extinguishing control panel, with which the subscribers communicate, can identify a subscriber on the basis of its correctly configured address or identifier. For this purpose, known subscribers have a mechanical addressing module, for example a DIP switch, which is mechanically set to the desired address before installing the subscriber, for example on the ceiling. The desired address or identifier can be gathered from a fire protection plan, for example.

However, this way of configuring the subscribers is susceptible to errors since intricate mechanical setting of the DIP switch, in particular in an environment of a construction site, results in an incorrectly configured subscriber. This is usually noticed only after commissioning and results in a considerable amount effort needed to correctly configure the subscriber.

Preconfiguration of subscribers, for example in such a manner that the address of the subscriber has already been set before delivery, is not practical in light of the number of subscribers, which is very high, and the required storage.

Finally, a further disadvantage of the known subscribers is that a housing of the subscribers must often be opened when configuring or addressing the subscribers. This creates further error sources since the interior of the housing, for example, can be contaminated while it is open.

The following documents were cited in the search report of the German Patent and Trademark Office for the priority-establishing application: DE 10 2016 201 883 A1, U.S. Pat. No. 5,818,334 A, WO 2010/043272 A1 and US 2016/0374120 A1.

SUMMARY OF THE INVENTION

Against this background, it was an object of the present invention to improve a subscriber mentioned at the outset in such a manner that a configuration which is less susceptible to errors and is simpler at the same time is possible.

According to a first aspect, the object is achieved, according to the invention, by means of a subscriber. The subscriber is preferably a module or device for monitoring a function and/or status and/or for transmitting an alarm. The subscriber has a first interface for communicating with a control panel, a data memory for storing configuration data relating to the subscriber comprising at least an identifier of the subscriber for identifying the subscriber with respect to the control panel, and a second interface for inputting configuration data to the data memory. The second interface has an NFC interface for communicating with a mobile write and/or read device, wherein the NFC interface is configured to receive at least the identifier of the subscriber from the mobile write and/or read device and to transmit it to the data memory.

In the subscribers according to the invention, configuration is enabled by virtue of data being received from a mobile write and/or read device via the second interface, which has an NFC interface, and being transmitted to the data memory, wherein the data comprise the identifier of the subscriber. At the same time, as a result of the fact that the control panel can identify the subscriber via the first interface, it becomes possible to directly check whether the subscriber has been configured correctly.

The identifier of the subscriber is preferably already preset in the factory so that it is possible, for example, to distinguish any technically different subscribers, in particular in order to identify different bus address spaces or the like. In addition, a further identifier in the form of text can preferably be carried out during the configuration of the subscriber, which simplifies identification of the subscriber by an operator.

The control panel is preferably a fire alarm and/or extinguishing control panel. On account of the system-critical position of such a fire alarm and/or extinguishing control panel, the configuration which is not very susceptible to errors according to the invention is particularly advantageous.

The first interface is preferably designed for connection by means of a connecting line in the form of a ring bus line. The configuration of communication via the first interface is not restricted in this case. For example, signals may be effected by modulating current and/or voltage, via the power supply as such, in the form of individual addressing, or as a voltage/current pulse transmission, for example in a form similar to an M-bus.

In practice, it is therefore possible and sufficient for an installer used to set up the fire protection device, for example, and having a suitable write device which likewise has an NFC interface, to only get close to the subscriber in order to configure the subscriber, namely to install its identifier on the subscriber. The previous opening of the housing, including the subsequently required manual actuation of the DIP switch, is therefore dispensed with. The probability of an error in the configuration is reduced by the transmission by radio instead of the mechanical setting.

In one embodiment, the subscriber is in the form of a limit switch for capturing a position, in particular of ball cocks, shut-off slides, shut-off valves and/or general slides.

In one embodiment, the subscriber is in the form of a pressure switch for measuring an air and/or water pressure, in particular in a compressed air water container or in a dry pipe network.

In one embodiment, the subscriber is in the form of a float switch for measuring a filling level and/or flooding, in particular in compressed air water containers, unpressurized water containers and/or other vessels for storing extinguishing fluid.

In one embodiment, the subscriber is in the form of a temperature switch, in particular for monitoring the ambient temperature in a sprinkler control panel.

In one embodiment, the subscriber is in the form of a pump pressure switch for starting a pump motor, in particular a sprinkler pump motor, in the event of a pressure drop in the pipeline network carrying extinguishing fluid and/or in a fitting.

In one embodiment, the subscriber is in the form of a fire alarm, in particular an automatic fire alarm and/or a manual fire alarm, and/or a hazard alarm for detecting events, fire alarms and disruptions. In other words, the fire alarm is preferably configured to detect or capture fire characteristic variables, events and/or disruptions and is preferably configured to pass on information to a central unit such as a fire alarm and/or extinguishing control panel.

In one embodiment, the subscriber is in the form of a position-determining device, in particular a proximity switch such as a magnetic switch or a light barrier, which is configured in the same manner as a limit switch.

In one embodiment, the subscriber is in the form of a combination of at least two of the subscribers described.

As a result of the configuration according to the invention, all of the subscribers described make it possible to improve the complicated and error-prone configuration. Nevertheless, the selection of the subscribers is not restricted to the subscribers mentioned by way of example and any further form, for which the advantages according to the invention appear, is likewise conceivable.

In one embodiment, the subscriber is configured to monitor an extinguishing system. An error-free configuration, as is achieved by the present invention, is decisive in these subscribers which are particularly critical with regard to failure safety.

In one embodiment, the first interface, the data memory and the second interface are configured as part of a communication module, wherein the communication module is designed to be reversibly connectable, in particular pluggable, to the rest of the subscriber.

The modular configuration of the first interface, the data memory and the second interface as part of a communication module makes it possible for the same communication module to be used irrespective of the functionality of the subscriber. It is therefore not necessary to develop different communication modules for different subscribers which communicate with the corresponding control panel. This embodiment is particularly advantageous when the subscriber already has a slot or another reversible connection possibility for such a communication module. As an alternative to the modular configuration, the first interface, the data memory and the second interface may also be permanently integrated in the subscriber.

In one embodiment, the subscriber also has a housing, wherein the NFC interface is configured to make it possible to transmit data without opening the housing and independently of the first interface.

Opening the housing usually also entails disconnecting the ring bus line, via which the subscriber communicates with the control panel. In any case, when a communication module, in particular comprising one of the interfaces for communication, is removed from the subscriber, the subscriber is disconnected from the ring bus line. By virtue of the fact that it is not necessary to open the housing and, in particular, a communication module or the like does not need to be removed from the subscriber either, there is also no need to disconnect the subscriber from the ring bus line, including the associated restrictions. However, at the same time, it is also not necessary for the ring bus line to be activated in order to transmit data. Data can preferably already be transmitted via the NFC interface.

In one embodiment, the second interface has an antenna, wherein the antenna is integrated, in particular together with the NFC interface, on a printed circuit board.

The antenna enables good transmission even through the housing. In particular in the preferred case in which the antenna is integrated, together with the NFC interface, on the printed circuit board, an emission characteristic parallel to the printed circuit board is advantageous. The antenna may be configured, for example, on a four-layer or multilayer PCB and may have eight turns in an exemplary embodiment. Other preferred configurations of the antenna are naturally also possible according to the circumstances.

In one embodiment, access control, in particular comprising authentication, for protecting the data transmission from unauthorized access is implemented by means of the second interface. In this case, a key is preferably required for some areas, for example the areas in which the address and configuration are stored, which key is provided, in particular, by the write and/or read device. The key, the address and the configuration are preferably transmitted without encryption in order to keep the demands imposed on the subscriber low. In other embodiments, however, the data can also be transmitted in an encrypted manner.

Access control prevents unauthorized persons from being able to gain access to the data relating to the subscriber and being able to manipulate a configuration of the subscriber, for example. This ensures the system integrity. As an alternative or in addition to encryption as access control, it is also possible to use a user name and/or a password, for example, which is provided, for example, by the write and/or read device or is input to the latter. Other types of access control are also possible.

In one embodiment, the second interface also has a mechanical setting means, in particular a DIP switch, wherein the mechanical setting means is configured as a fallback solution for inputting the identifier of the subscriber.

As a result of the fact that the mechanical setting means is configured as a fallback solution for inputting the identifier of the subscriber, it is also possible to securely input the identifier of the subscriber when, for example, the NFC interface or the mobile write and/or read device for communicating with the second interface fails. The mechanical setting means is preferably the DIP switch which is already implemented, as known, in subscribers, with the result that there is no need to adapt the subscriber.

In one embodiment, the second interface is configured a) to receive further data, in particular configuration data relating to the subscriber, from the mobile write and/or read device and to transmit said data to the data memory and/or to the control panel via the first interface, and/or b) to receive data, in particular status information relating to the status of the configuration of the subscriber, from the control panel via the first interface and to transmit said data to the mobile write and/or read device.

Therefore, data which are indicative of the location of the subscriber, for example, can be transmitted via the second interface and can then be communicated to the control panel in order to be directly validated. At the same time, the control panel can also transmit data to the subscriber via the first interface, which data are then transmitted to the mobile write and/or read device via the second interface. As a result, the communication, for example, can be used to directly check whether the subscriber has been configured without errors.

The control panel can particularly preferably be configured for direct communication with the write and/or read device, with the result that the data can be transmitted from the control panel to the mobile write and/or read device in two ways. This enables redundant communication which makes it possible, for example, to compare the data received by the subscriber with the data received directly by the control panel.

In a second aspect, the object is achieved, according to the invention, by means of a communication module of a subscriber, in particular of a module or device for monitoring a function and/or status and/or for transmitting an alarm. The communication module has a first interface for communicating with a control panel, preferably a fire alarm and/or extinguishing control panel, wherein the first interface is designed, in particular, for connection by means of a connecting line in the form of a ring bus line, a data memory for storing configuration data relating to the subscriber comprising at least an identifier of the subscriber for identifying the subscriber with respect to the control panel, and a second interface for inputting configuration data to the data memory. The second interface has an NFC interface for communicating with a mobile write and/or read device, wherein the NFC interface is configured to receive at least the identifier of the subscriber from the mobile write and/or read device and to transmit it to the data memory.

The communication module is configured to act as part of a subscriber and makes it possible to achieve the advantages according to the invention which were described in detail with reference to the subscriber. The communication module can be provided as an independent product or component which can be connected to the subscriber by means of a simple connection, for example a plug-in connection. The embodiments described for the subscriber according to the first aspect can likewise be applied to the communication module of this aspect.

The communication module is preferably designed in such a manner that it is reversibly connectable, in particular pluggable, to the rest of a subscriber. In this embodiment, disconnection of the ring bus line can be avoided overall even when the communication module is disconnected from the subscriber. This is because only the connection between the associated subscriber and the ring bus line can then be disconnected without requiring disconnection of the ring bus line overall.

In a third aspect, the object is achieved, according to the invention, by means of a subscriber, in particular a module or device for monitoring a function and/or status and/or for transmitting an alarm, including signal and monitoring transmitters, detectors, fire alarms, actuators, multifunction detection systems, automatic optical and/or acoustic alarm transmitters, controllers and circuits for air-conditioning systems, device disconnection means, extinguishing systems or components thereof and remote alarm transmitters, wherein the subscriber is prepared to have a communication module according to the second aspect.

The subscriber is prepared such that a communication module is accommodated therein, for example is connected thereto by means of a plug-in connection. As a result, the subscriber makes it possible to achieve the advantages already described with reference to the first and second aspects according to the invention by virtue of the connection to the communication module.

In a fourth aspect, the object is achieved by means of a system for configuring a fire protection system. The system has a subscriber, a control panel, in particular a fire alarm and/or extinguishing control panel, and a mobile write and/or read device. The mobile write and/or read device has a third interface, in particular an NFC interface, for communicating with the subscriber, wherein the NFC interface is configured to transmit at least an identifier of the subscriber to the subscriber.

The subscriber is preferably a subscriber according to the invention in accordance with the first aspect. The system preferably has a plurality of such subscribers; in a particularly preferred case, the system is a sprinkler system in which the subscribers monitor valve states and overpressure/underpressure in the extinguishing water lines in order to detect the operational readiness. Furthermore, the system according to the fourth aspect also makes it possible to achieve the advantages described with reference to the first to third aspects. The particular configurations described with reference to the further aspects can likewise be used.

In one embodiment, the mobile write and/or read device is configured to communicate with the control panel via a fourth interface, in particular by means of a wired or wireless network.

The mobile write and/or read device can therefore communicate with the control panel directly and therefore without the interposed subscriber. In addition, the mobile write and/or read device can also communicate with the control panel indirectly, that is to say via the third interface and the subscriber. The two possible ways of communicating with the control panel make it possible to check the communicated data and therefore to reduce the susceptibility of the configuration to errors.

In one embodiment, the mobile write and/or read device is configured to receive the identifier from the control panel via the fourth interface and to transmit it to the subscriber via the third interface.

Data to be transmitted can preferably be selected on the mobile write and/or read device. By virtue of the identifier being received via the fourth interface, the control panel can directly check, after the identifier has been transmitted to the subscriber, whether the correct configuration data have been transmitted to the subscriber by querying the subscriber. The mobile write and/or read device likewise has the possibility of checking, via the third and fourth interfaces, whether the configuration is without errors. As alternative to receiving the identifier via the fourth interface, the identifier can also be defined by the mobile write and/or read device and transmitted to the control panel via the fourth interface.

In a fifth aspect, the object is achieved by means of a method for configuring a subscriber, in particular a module or device for monitoring a function and/or status and/or for transmitting an alarm. The method has the following steps of:

providing configuration data relating to a subscriber, having at least an identifier of the subscriber, on a mobile write and/or read device, transmitting the configuration data to a second interface of the subscriber via a third interface, in particular an NFC interface, of the mobile write and/or read device, transmitting the configuration data to a data memory of the subscriber, and communicating at least some of the configuration data to a control panel, in particular a fire alarm and/or extinguishing control panel, by means of the subscriber.

The method therefore makes it possible for the subscriber to be configured by means of the mobile write and/or read device without having to manually change the subscriber, for example by setting a switch, opening the housing, etc. Configuration is effected by means of the radio interface which is in the form of an NFC interface, in particular, and enables wireless transmission between the write and/or read device and the subscriber. The method according to the invention therefore makes it possible to achieve the same advantages as those achieved by the further aspects according to the invention. The particular configurations of the further aspects can therefore also be applied in the same manner to the method according to the invention.

In one embodiment of the method, before the step of transmitting the configuration data, the mobile write and/or read device is brought to a distance from the subscriber which is below a maximum distance. This ensures communication between the mobile write and/or read device and the subscriber for the purpose of transmitting the configuration data.

In one embodiment of the method, the mobile write and/or read device checks the configuration of the subscriber by communicating with the control panel via a fourth interface. Error-free configuration of the subscriber can be ensured by the redundant communication which thus results.

DESCRIPTION OF THE DRAWINGS

Further advantages and advantageous configurations of the aspects according to the invention are explained below with reference to the examples in the accompanying figures, in which.

DETAILED DESCRIPTION OF THE INVENTION

Figure 1:
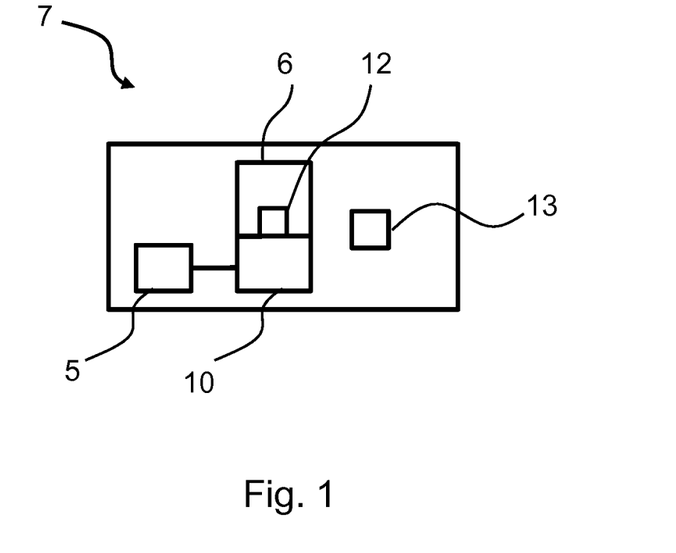
FIG. 1 shows, schematically and by way of example, one exemplary embodiment of a subscriber according to the invention.

FIG. 1 shows, schematically and by way of example, a subscriber 7 which is used, for example, to monitor the operational readiness in sprinkler systems or other fire protection systems. The subscriber 7 is, without being limited thereto, a limit switch, a pressure switch, a float switch, a temperature switch, a pump pressure switch and/or a fire alarm, for example. The fire protection system is, in particular, a sprinkler system, but other fire protection systems are also configured for use with the subscriber 7. Valve states, pressures and/or a temperature in the system is/are monitored, inter alia, by the subscriber 7.

The subscriber 7 has a first interface 13 for communicating with a control panel, in particular a fire alarm and/or extinguishing control panel. For example, the subscribers 7 are connected to the control panel via a two-wire loop technology or another technology, as also described in more detail later with reference to FIGS. 3 and 4.

The subscriber 7 also has a data memory 6 in which configuration data 12 relating to the subscriber 7 are stored. The configuration data 12 comprise, in particular, an identifier of the subscriber 7 which is required for communication with the control panel. For example, the identifier of the subscriber 7 may be defined as a number which is unique in the fire protection system. In a known communication protocol, there are addresses between 0 and 127, for example, in which case other address spaces are also accessible in other systems. It is known practice to set the address or identifier of the subscriber 7 manually, for example via DIP switches. For setting by means of DIP switches, the subscriber 7 must be screwed on and the address of the subscriber 7 must then be set in binary format. This manual setting is susceptible to errors and can also result in contamination of the subscriber 7 after the subscriber 7 is opened, for example.

Data going beyond the configuration data 12 can also be stored in the data memory 6.

In order to transmit the configuration data to the data memory 6, the subscriber 7 according to the invention also has a second interface 10. The second interface is designed, in particular in the form of an NFC interface, for communication with a mobile write and/or read device (not shown in FIG. 1). For this purpose, the second interface 10 comprises an antenna 5 which may be directly integrated in a common circuit board of the subscriber, for example. Alternatively, the antenna 5 may also be provided as an independent component. NFC (near field communication) is a wireless transmission technology for short distances which is based on RFID (radio frequency identification).

Figure 2:
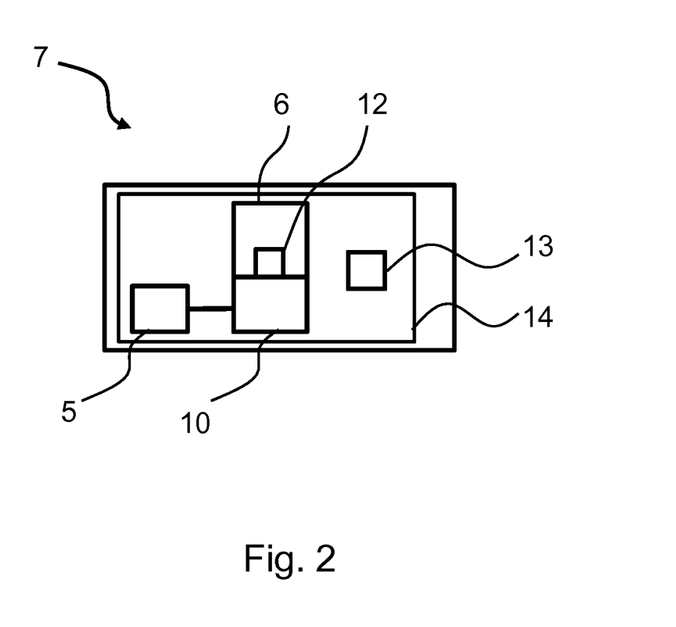
FIG. 2 shows, schematically and by way of example, a further exemplary embodiment of a subscriber according to the invention.

FIG. 2 shows, schematically and by way of example, the subscriber 7 from FIG. 1, in which the data memory 6, the second interface 10 and the first interface 13 are integrated in a communication module 14. The communication module 14 can be disconnected from the rest of the subscriber 7 and can be plugged into a suitable interface of the subscriber 7, for example, or can be connected thereto in another manner. The communication module 14 makes it possible for a plurality of types of subscribers 7 to be equipped with a single type of communication module 14. This enables the improved addressing of the subscribers, which is achieved according to the invention, in the fire protection system for a plurality of types of subscribers 7 without all of the subscribers 7 having to be modified. Rather, it is sufficient to create the possibility of the subscriber 7 accommodating the communication module 14. With the exception of the communication module 14, which is in the form of a removable component, the subscribers 7 in FIGS. 1 and 2 are identical and have the same functionality.

Figure 3:
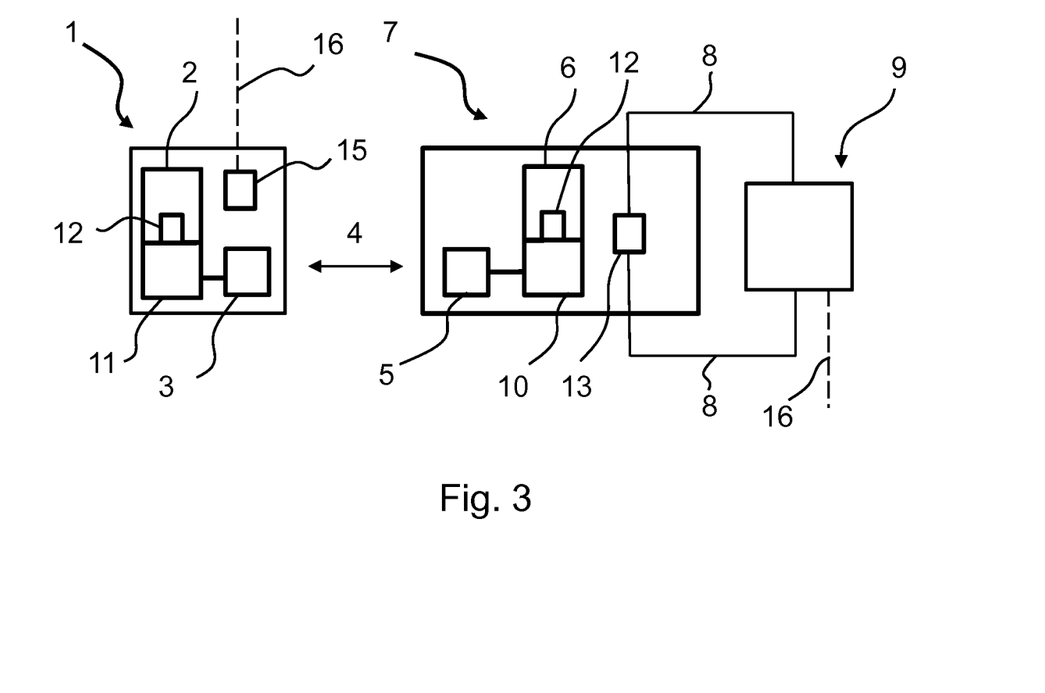
FIG. 3 shows, schematically and by way of example, one exemplary embodiment of a system according to the invention.
Figure 4:
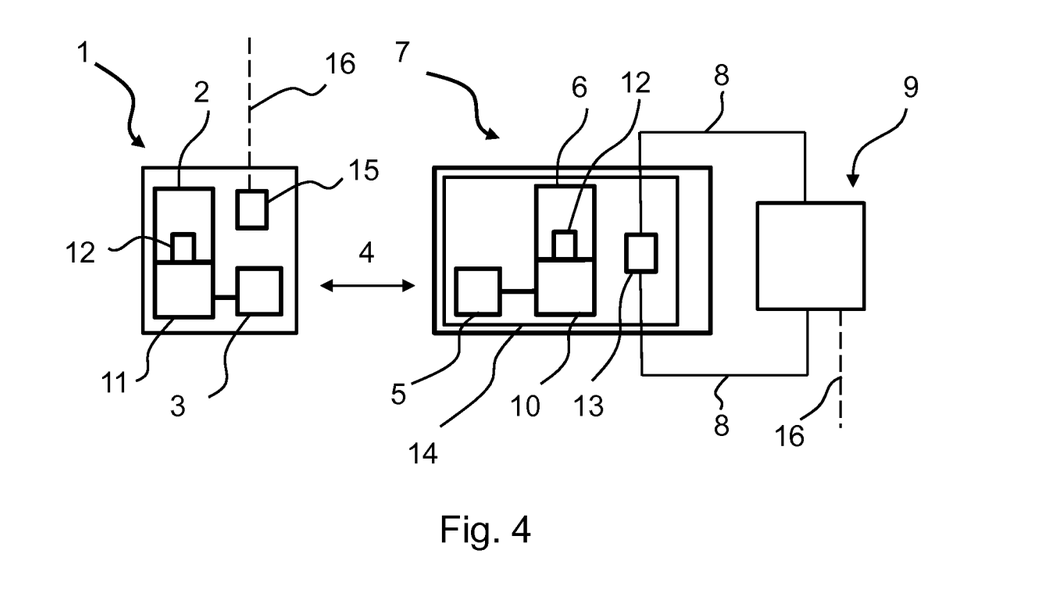
FIG. 4 shows, schematically and by way of example, a further exemplary embodiment of a system according to the invention.

FIG. 3 and FIG. 4 show, schematically and by way of example, a system for configuring a fire protection system, which has a mobile write and/or read device 1, a subscriber 7 and a control panel 9. FIG. 3 and FIG. 4 are identical with the exception of the subscriber 7 which, in FIG. 3, corresponds to the subscriber from FIG. 1 and, in FIG. 4, corresponds to the subscriber from FIG. 2 which has a communication module 14. Accordingly, the functionality of the systems shown in FIGS. 3 and 4 is identical and the description is given together for both systems shown by way of example.

The subscriber 7 communicates with the control panel 9, which is in the form of a fire alarm and/or extinguishing control panel for example, via a connecting line 8. This communication is preferably effected by means of data packets or data words which are transmitted via the connecting line 8 by modulating the supply voltage. The subscribers 7 in turn respond to a received data packet, preferably by modulating their current consumption. Other possible data transmission paths between the subscriber 7 and the control panel 9 are naturally also conceivable. The connecting line 8 is preferably a ring bus line, but other connecting lines are also conceivable. The ring bus line is configured, for example, as two-wire loop technology, in which case the subscribers 7 are supplied with voltage by the control panel 9 via two wires. The data transmission can then be modulated by connecting resistors, for example.

The control panel 9 detects the data packets coded by the subscribers 7 and evaluates them. Fire alarms, prealarm notifications, error messages and/or operational readiness states and further status information can therefore be detected, for example.

The subscriber 7 communicates with the write and/or read device 1 via the second interface 10 by means of a communication connection 4. The communication connection 4 is, for example, an NFC radio connection which transmits radio signals between the antenna 5 of the subscriber 7 and an antenna 3 of the write and/or read device 1.

The write and/or read device 1 also has a data memory 2 containing configuration data 12. These configuration data 12 are then transmitted from the write and/or read device 1, if it is arranged in the vicinity of the subscriber 7, to the subscriber 7 via a third interface 11 and the antenna 3.

Further data which go beyond the configuration data 12 can also be transmitted between the subscriber 7 and the write and/or read device 1 via the communication connection 4.

In this case, both the transmission direction from the write and/or read device 1 to the subscriber 7 and the opposite transmission direction are possible.

Finally, the write and/or read device 1 has a fourth interface 15 for communicating with a network 16. The network 16 is also directly connected to the control panel 9, with the result that the write and/or read device 1 cannot only communicate with the control panel 9 via the communication connection 4 and the connecting line 8 but can also directly communicate with the control panel 9 via the network 16. The network 16 makes it possible, for example, for the write and/or read device 1 to check the error-free transmission of the configuration data 12 by means of a comparison with the control panel 9.

In the example shown in FIG. 4, the subscriber 7 has the communication module 14. The communication functionality is implemented separately from the rest of the subscriber 7 as a component which can be disconnected therefrom by means of the communication module 14.

The subscriber 7 may also have a mechanical setting means for inputting the identifier of the subscriber, for example in the form of a DIP switch. The DIP switch can then be in the form of a fallback solution, for example if communication via the communication connection 4 fails. On the other hand, however, the mechanical setting means can also make it possible to superimpose the address or identifier of the subscriber 7 when a particular setting of the mechanical setting means has been made. In other words, the identifier of the subscriber 7 may be hard-wired by actuating the mechanical setting means, which identifier then cannot be overwritten by the data transmission using NFC. For example, a data transmission for transmitting the identifier of the subscriber 7 may be possible only when the address of the mechanical setting means is zero or another stipulated value. This makes it possible for conventional addressing by actuating the mechanical setting means to also remain possible.

In a further example, it is also possible to first of all transmit the address using NFC and to then bring the DIP switches to the zero position. Although transmission using NFC is always possible, the address transmitted using NFC is used only on the basis of the DIP switch position, for example if the DIP switches are in the zero position.

Figure 5:
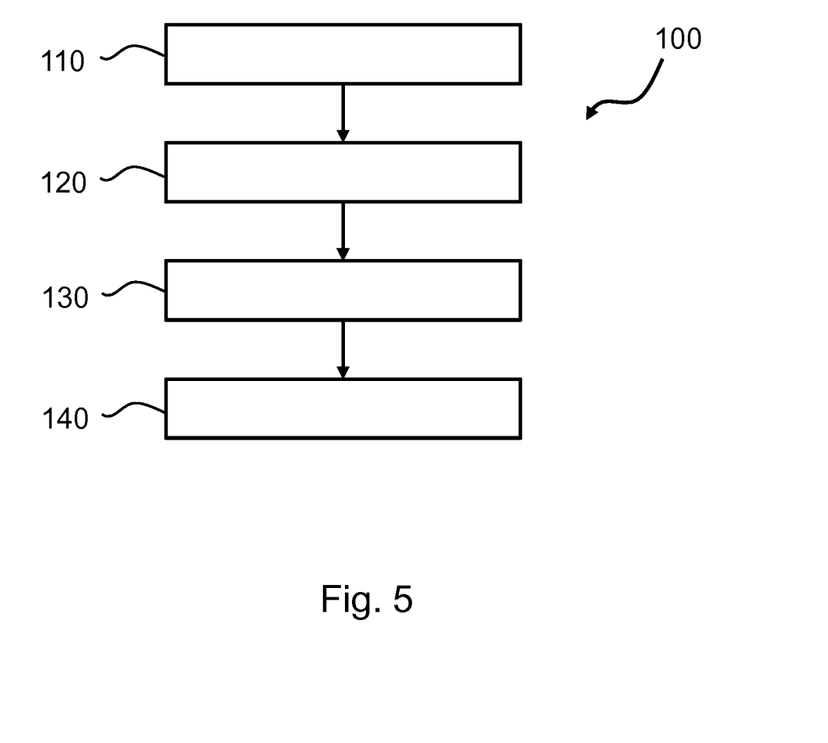
FIG. 5 shows, schematically and by way of example, a flowchart of a method according to the invention.

FIG. 5 finally shows, schematically and by way of example, a flowchart of a method 100 according to the invention for configuring a subscriber 7, in particular in a system as shown in FIGS. 3 and 4. The method first of all comprises a step 110 of providing configuration data 12 relating to a subscriber 7 on a mobile write and/or read device 1. The configuration data 12 have at least an identifier of the subscriber 7.

In a step 120, the configuration data 12 are transmitted between a third interface 11 of the mobile write and/or read device 1 and a second interface 10 of the subscriber 7 via a communication connection 4, in particular an NFC connection.

The configuration data 12 are then transmitted to a data memory 6 in the subscriber 7 in a step 130.

Finally, at least parts of the configuration data 12 are communicated to the control panel 9 by the subscriber 7 in a step 140. This enables identification of the subscriber 7 with respect to the control panel 9.

Before the step 120 of transmitting the configuration data, the mobile write and/or read device 1 is brought to a short distance from the subscriber 7 since the NFC connection requires a proximity between the write and/or read device and the subscriber 7. In particular, an antenna 3 of the write and/or read device 1 must be brought into the vicinity of the antenna 5 of the subscriber 7 in order to establish the communication connection 4.

LIST OF REFERENCE NUMERALS:

1 Write and/or read device
2 Data memory
3 Antenna
4 Communication connection
5 Antenna
6 Data memory
7 Subscriber
8 Connecting line
9 Control panel
10 Second interface
11 Third interface
12 Configuration data
13 First interface
14 Communication module
15 Fourth interface
16 Network

The invention claimed is:

1. A subscriber for monitoring a function and/or status and/or for transmitting an alarm, having:

a first interface for communicating with a control panel including a fire alarm and/or extinguishing control panel, wherein the first interface is designed for connection by a connecting line in the form of a ring bus line, a data memory for storing configuration data relating to the subscriber comprising at least an identifier of the subscriber for identifying the subscriber with respect to the control panel, and a second interface for inputting configuration data to the data memory, wherein the second interface has an NFC interface for communicating with a mobile write and/or read device, wherein the NFC interface is configured to receive at least the identifier of the subscriber from the mobile write and/or read device and to transmit it to the data memory.

2. The subscriber as claimed in claim 1, which is in the form of at least one subscriber selected from the following list:

a limit switch for capturing a position of ball cocks, shut-off slides, shut-off valves and/or general slides;

a pressure switch for measuring an air and/or water pressure in a compressed air water container or in a dry pipe network;

a float switch for measuring a filling level and/or flooding in compressed air water containers, unpressurized water containers and/or other vessels for storing extinguishing fluid;

a temperature switch for monitoring the ambient temperature in a sprinkler control panel;

a pump pressure switch for starting a pump motor in the event of a pressure drop in the pipeline network carrying extinguishing fluid and/or in a fitting;

a fire alarm including an automatic fire alarm and/or a manual fire alarm and/or a hazard alarm for detecting events, fire alarms and disruptions;

a position-determining device including a magnetic switch or a light barrier, which is configured in the same manner as a limit switch.

3. The subscriber as claimed in claim 1, wherein the subscriber is configured to monitor an extinguishing system.

4. The subscriber as claimed in claim 1, wherein the first interface, the data memory and the second interface are configured as part of a communication module, wherein the communication module is designed to be reversibly connectable to the rest of the subscriber.

5. The subscriber as claimed in claim 1, which also has a housing, wherein the NFC interface is configured to make it possible to transmit data without opening the housing and independently of the first interface.

6. The subscriber as claimed in claim 1, wherein the second interface has an antenna, wherein the antenna is integrated together with the NFC interface on a printed circuit board.

7. The subscriber as claimed in claim 1, wherein an access control comprising authentication for protecting the data from unauthorized access is implemented by the second interface.

8. The subscriber as claimed in claim 1, wherein the second interface also has a mechanical setting means wherein the mechanical setting means is configured as a fallback solution for inputting the identifier of the subscriber.

9. The subscriber as claimed in claim 1, wherein the second interface is configured to receive further data including configuration data relating to the subscriber from the mobile write and/or read device and to transmit said data to the data memory and/or to the control panel via the first interface, and/or to receive data including status information relating to the status of the configuration of the subscriber from the control panel via the first interface and to transmit said data to the mobile write and/or read device.

10. A communication module of a subscriber including a module or device for monitoring a function and/or status and/or for transmitting an alarm, the communication module has comprising:

a first interface for communicating with a control panel including a fire alarm and/or extinguishing control panel, wherein the first interface is designed for connection by a connecting line in the form of a ring bus line, a data memory for storing configuration data relating to the subscriber comprising at least an identifier of the subscriber for identifying the subscriber with respect to the control panel, and a second interface for inputting configuration data to the data memory, wherein the second interface has an NFC interface for communicating with a mobile write and/or read device, wherein the NFC interface is configured to receive at least the identifier of the subscriber from the mobile write and/or read device and to transmit it to the data memory.

11. A subscriber having a communication module as claimed in claim 10, the subscriber comprising: a module or device for monitoring a function and/or status and/or for transmitting an alarm, including signal and monitoring transmitters, detectors, fire alarms, actuators, multifunction detection systems, automatic optical and/or acoustic alarm transmitters, controllers and circuits for air-conditioning systems, device disconnection means, extinguishing systems or components thereof and remote alarm transmitters.

12. A system for configuring a fire protection system, having a subscriber as claimed in claim 1, a control panel including a fire alarm and/or extinguishing control panel, and a mobile write and/or read device having a third interface including an NFC interface for communicating with the subscriber, wherein the NFC interface is configured to transmit at least an identifier of the subscriber to the subscriber.

13. The system as claimed in claim 12, wherein the mobile write and/or read device is configured to communicate with the control panel via a fourth interface by a wired or wireless network.

14. The system as claimed in claim 13, wherein the mobile write and/or read device is configured to receive the identifier from the control panel via the fourth interface and to transmit it to the subscriber via the third interface.

15. A method for configuring a subscriber including a module or device for monitoring a function and/or status and/or for transmitting an alarm, the method comprising the steps of:

providing configuration data relating to a subscriber, having at least an identifier of the subscriber, on a mobile write and/or read device, transmitting the configuration data to a second interface of the subscriber via a third interface including an NFC interface, of the mobile write and/or read device, transmitting the configuration data to a data memory of the subscriber, and communicating at least some of the configuration data to a control panel including a fire alarm and/or extinguishing control panel, by means of the subscriber.

16. The method as claimed in claim 15, wherein, before the step of transmitting the configuration data, the mobile write and/or read device is brought to a distance from the subscriber which is below a maximum distance.

17. The method as claimed in claim 15, wherein the mobile write and/or read device checks the configuration of the subscriber by communicating with the control panel via a fourth interface.

\* \* \* \* \*